United States Patent
Lahiri

(10) Patent No.: US 7,506,273 B2
(45) Date of Patent: Mar. 17, 2009

(54) METHOD AND SYSTEM FOR MODIFYING PROPERTIES OF GRAPHICAL USER INTERFACE COMPONENTS

(75) Inventor: Sandip Lahiri, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 10/392,806

(22) Filed: Mar. 19, 2003

(65) Prior Publication Data

US 2004/0183838 A1    Sep. 23, 2004

(51) Int. Cl.
*G06F 3/00* (2006.01)
(52) U.S. Cl. .............. 715/854; 715/762; 715/765; 707/100
(58) Field of Classification Search ........... 715/744, 715/762, 765, 854; 707/100
See application file for complete search history.

(56) References Cited

U.S. PATENT DOCUMENTS

| | | | | |
|---|---|---|---|---|
| 5,923,845 | A * | 7/1999 | Kamiya et al. ............ | 709/206 |
| 6,023,714 | A * | 2/2000 | Hill et al. ............... | 715/235 |
| 6,307,544 | B1 * | 10/2001 | Harding ................ | 715/709 |
| 6,393,474 | B1 | 5/2002 | Eichert et al. ........... | 709/223 |
| 6,429,882 | B1 | 8/2002 | Abdelnur et al. .......... | 345/763 |
| 6,476,828 | B1 * | 11/2002 | Burkett et al. ........... | 715/760 |
| 6,480,863 | B1 | 11/2002 | Schiefler et al. ........ | 707/103 R |
| 6,487,607 | B1 | 11/2002 | Wollrath et al. .......... | 709/330 |
| 6,677,962 | B1 * | 1/2004 | Bailey ................. | 715/744 |
| 6,778,992 | B1 * | 8/2004 | Searle et al. ............ | 707/101 |
| 7,002,593 | B2 * | 2/2006 | Milch et al. ............ | 345/589 |
| 7,073,130 | B2 * | 7/2006 | Novak et al. ............ | 715/744 |
| 2002/0024539 | A1 * | 2/2002 | Eleftheriadis et al. ...... | 345/765 |
| 2002/0099713 | A1 * | 7/2002 | Fernandez et al. ........ | 707/100 |
| 2002/0147748 | A1 * | 10/2002 | Huang et al. ............ | 707/517 |
| 2003/0071860 | A1 * | 4/2003 | Goddard et al. .......... | 345/866 |
| 2003/0163466 | A1 * | 8/2003 | Rajaraman et al. ......... | 707/6 |
| 2003/0233620 | A1 * | 12/2003 | Vedullapalli et al. ....... | 715/522 |
| 2004/0054675 | A1 * | 3/2004 | Li .................... | 707/100 |
| 2004/0205585 | A1 * | 10/2004 | McConnell ............. | 715/513 |
| 2004/0261017 | A1 * | 12/2004 | Perry ................. | 715/513 |
| 2005/0022132 | A1 * | 1/2005 | Herzberg et al. .......... | 715/759 |

OTHER PUBLICATIONS

Kurlow, Stephen, A new object-oriented technique for building a dynamic Graphical User Interface, Sep. 1995, pp. 1-11.*
Orleans et al, DJ: Dynamic Adaptive Programming in Java, Jul. 2001, pp. 1-8.*
Guglielmo, G., Dynamic Graphical User Interfaces using XML and JPython, Apr. 2000, pp. 1-5.*

* cited by examiner

*Primary Examiner*—Stephen S Hong
*Assistant Examiner*—Ryan F Pitaro
(74) *Attorney, Agent, or Firm*—Yee & Associates, P.C.; David A. Mims, Jr.

(57) ABSTRACT

A method, computer program product, and data processing system for modifying attributes of GUI components without invasive code modification are disclosed. In a preferred embodiment, a set of attributes for GUI components is loaded into memory from persistent storage, such as a file. A root container component forming the root of a hierarchy of components defined by a containment relation is identified and passed as a parameter to a routine that traverses the hierarchy so as to visit each GUI component. As each GUI component is visited, if one or more attributes from the aforementioned set of attributes are found to be applicable to the visited GUI component, the GUI component's attributes are modified to comport with the set of attributes.

18 Claims, 5 Drawing Sheets

```
<ResourceProperties>
    <Button>
        <DayMode>
            <BackgroundColor>lightGray</BackgroundColor>
            <ForegroundColor>black</ForegroundColor>
            <FocusBackgroundColor>red</FocusBackgroundColor>
            <FocusForegroundColor>black</FocusForegroundColor>
            <Font>
                <Name>SansSerif</Name>
                <Type>Bold</Type>
                <Size>14</Size>
            </Font>
        </DayMode>
        <NightMode>
            <BackgroundColor>black</BackgroundColor>
            <ForegroundColor>green</ForegroundColor>
            <FocusBackgroundColor>lightGray</FocusBackgroundColor>
            <FocusForegroundColor>yellow</FocusForegroundColor>
            <Font>
                <Name>SansSerif</Name>
                <Type>Bold</Type>
                <Size>14</Size>
            </Font>
        </NightMode>
    </Button>
    <Button name=OK>
        <DayMode>
            <BackgroundColor>blue</BackgroundColor>
            <ForegroundColor>yellow</ForegroundColor>
            <FocusBackgroundColor>red</FocusBackgroundColor>
            <FocusForegroundColor>black</FocusForegroundColor>
            <Font>
                <Name>SansSerif</Name>
                <Type>Italic</Type>
                <Size>14</Size>
            </Font>
        </DayMode>
        <NightMode>
            <BackgroundColor>black</BackgroundColor>
            <ForegroundColor>yellow</ForegroundColor>
            <FocusBackgroundColor>green</FocusBackgroundColor>
            <FocusForegroundColor>black</FocusForegroundColor>
            <Font>
                <Name>SansSerif</Name>
                <Type>Italic</Type>
                <Size>14</Size>
            </Font>
        </NightMode>
    </Button>
</ResourceProperties>
```

FIG. 3

```
public static void setProperties(Container container) {   ~602
        // If null pointer, simply return to avoid exception
604 {   if(container == null) {
            return;
        }
                                                                          600
        // Set properties for the container itself first . . .

// If the container is a JPanel, set JPanel properties
606 ~ if (container instanceof JPanel) {
            // If the container is a specifically-named component, use the properties for that component
608 ~       if(named.contains (container.getName( ))) {
                _setNamedPanelValues((JPanel)container, container.getName( )) ;  ~610
            }

// Otherwise use the default values
612 ~       else {
                _setDefaultPanelValues((JPanel)container) ;  ~614
            }
        }
615 ~ // . . . Set properties for each type of container . . .
        // Get array of child components for this container
616 ~ Component[ ] children = container.getComponents( ) ;
        // If there are no children, then return
618 {   if(children == null || children.length <= 0) {
            return;
        }
        // Otherwise, loop through the children
620 ~   for (int i=0; i < children.length; i++) {
            // If child is a JButton, set JButton properties
622 ~       if(children[i] instanceof JButton) {                              626
624 ~           if(named.contains(children[i].getName( )) {                   /
                    _setNamedButtonValues((JButton)children[i], children[i].getName( )) ;
                }
628 ~           else {
                    _setDefaultButtonValues((JButton)children[i]) ;  ~630
                }
                continue;  ~632
            }
            // If child is a JLabel, set JLabel properties
            //
634 ~       if(children[i] instanceof JLabel) {
```

```
                                                    600
                              FROM FIG. 6A         ↙

636 ── if(named.contains(children[i].getName()) {           638
                  _setNamedLabelValues((JLabel)children[i], children[i].getName());
           }
    640 ── else {
                  _setDefaultLabelValues((JLabel)children[i]); ── 642
           }
           continue; ── 644
      }

646 ── // ... Properties set for each non-container component
           // Recursive call to set properties for a child that is a container
           if(children[i] instanceof Container) {
    648 ⎰      setProperties((Container) children[i]);
           ⎱   continue;
           }
      }
   }
```

FIG. 6B

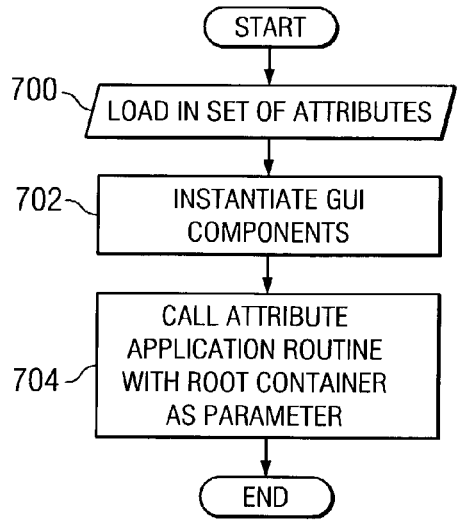

FIG. 7

METHOD AND SYSTEM FOR MODIFYING PROPERTIES OF GRAPHICAL USER INTERFACE COMPONENTS

BACKGROUND OF THE INVENTION

1. Technical Field

The present invention is related generally to software that provides a graphical user interface. Specifically, the present invention is directed toward providing a means of modifying the properties of graphical user interface components without resorting to extensive changes in source code.

2. Description of Related Art

Many computer software products today utilize a graphical user interface or GUI (typically pronounced like "gooey"). A GUI is simply a visual means of human-computer interaction that utilizes pictures or other visual representations besides text or characters.

Most GUIs make use of visual controls that are displayed on the user's display and actuated by user input in order to provide input to the software associated with the GUI. In a typical GUI, a pointing device, such as a mouse, is used to move a cursor around a display and actuate visual controls. A GUI will typically also make use static display components, such as icons or text, for the display of information.

Many GUIs are what is known as a "windowing" interface, because they arrange information visually on a display in the form of panels or "windows" superimposed on a background called a "desktop." Typically, a window will contain a number of visual controls and static display component to facilitate user interaction.

Windows, visual controls, and static display components are what are known as GUI components, because they are the building blocks that make up the GUI. Some GUI components, such as windows, are known as "container components" (or simply "containers"), because they may contain other components. Because a container component is itself a component, a container may also contain another container.

Container components include windows, but may also include other components, which may be visible or invisible. Some GUIs make use of invisible container components to group other components together in some visual arrangement or non-visual relationship (e.g., mutually exclusive checkboxes).

Many modern programming language implementations have built-in features for producing GUIs, usually either by providing an interface to services provided by system-level software or by including standard libraries of GUI code. The JAVA™ programming language, for example, is an object-oriented programming language that includes standard application programming interfaces (APIs) for defining GUIs. Two APIs that are currently part of the JAVA™ programming language standard are the Abstract Windowing Toolkit (AWT) API and the Swing API. In the JAVA™ programming language, as is typical of object-oriented GUI APIs, each type of GUI component is defined as a class. In an object-oriented programming language, a class is a definition of a data type that includes a collection of data, called member variables, and a set of operations that may be performed on the data, called methods (or alternatively, member functions). An actual collection of data in the data type defined by a class is called an object. In object-oriented programming (OOP) parlance, an object is said to be an "instance" of its class, because it is an actual item of data that is defined in accordance with the class. The run-time process of generating an object in an object-oriented programming language is called "instantiation," and an object that exists at run-time is said to be "instantiated."

Object-oriented programming languages also typically provide for what is known as "inheritance." Using inheritance, a new class (called a "descendant" class) can be defined in terms of one or more existing classes (called "base" classes) so that the descendant class inherits one or more of the member variables or methods of the base class. As a general rule in object-oriented languages, an object of a descendant class can be treated as being an instance of the base class. This ability to treat objects from descendant classes as if they were instances of base classes is called "polymorphism."

In an object-oriented GUI API, such as those provided by the JAVA™ programming language, GUI components are instantiated as objects, and relationships are established between the instantiated objects in order to define the placement and behavior of GUI components with respect to each other. For example, a "containment relation" is a relationship between GUI components that relates a container component to the components contained by that container component. In an object-oriented GUI API, for example, container classes may define methods that establish a containment relation by making the container contain some other component.

A typical GUI component has one or more attributes that define particular properties of the component. For example, a "button" component in a typical GUI will have attributes that define the size of the button on the display, the text or graphics displayed on the face of the button, the background color of the button, a keyboard shortcut associated with the button, and the like. In general, the portion of program code (e.g., function, method, subroutine, procedure, etc.) that instantiates a GUI component will also contain a number of lines of code that set the attributes for that component to desired values.

Sometimes, the general look or GUI content of an entire computer program needs to be modified. In cases such as these, different attributes for the GUI components will need to be set. For example, it may be necessary to enlarge all of the GUI components and their text if a program is being adapted to be used by users with poor eyesight. As another example, if a program is being adapted for users speaking different languages, the text, character set, and component sizes may need to be modified. If the code that sets attributes for each component is buried within the source code for the program along with the code for instantiating the components, this means that an exhaustive search and careful modification of the of the source code is necessary in order to effect this sort of large-scale or global change in GUI display or behavior.

As another example, it is sometimes necessary to adapt a program to execute in multiple display modes. For example, it may be necessary to use different colors at different times of the day. In such cases, global changes to an existing GUI display at run-time will be necessary.

GUI component attributes for a single component are difficult to modify, as well, because the code for setting attributes for that component may be buried within many lines of code or even spread out across a large program.

Thus, a need exists for a means to effect large-scale or global changes to attributes of GUI components without invasive program code modification.

SUMMARY OF THE INVENTION

The present invention provides a method, computer program product, and data processing system for modifying attributes of GUI components without invasive code modification. In a preferred embodiment, a set of attributes for GUI components is loaded into memory from persistent storage, such as a file. A root container component forming the root of a hierarchy of components defined by a containment relation is identified and passed as a parameter to a routine that traverses the hierarchy so as to visit each GUI component. As each GUI component is visited, if one or more attributes from the aforementioned set of attributes are found to be applicable to the visited GUI component, the GUI component's attributes are modified to comport with the set of attributes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a diagram of a file containing a set of attributes to be applied to instantiated GUI components in a preferred embodiment of the present invention;

FIGS. 6A-6B are together a diagram of an attribute application routine expressed in a JAVA™-like pseudo code in accordance with a preferred embodiment of the present invention;

FIG. 7 is a flowchart representation of a process followed by run-time environment to apply attributes to instantiated GUI components in a preferred embodiment of the present invention.

DETAILED DESCRIPTION OF THE PREFERRED EMBODIMENT

Figure 1:
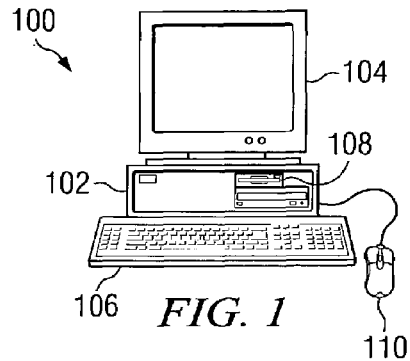
FIG. 1 is an external diagram of an example of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
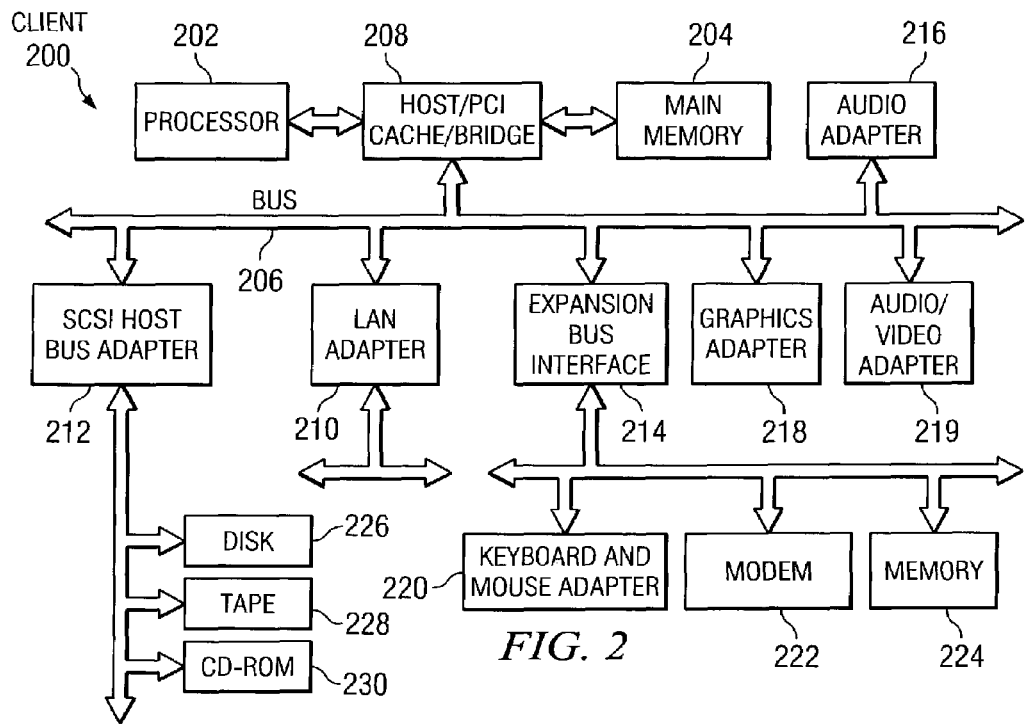
FIG. 2 is a block diagram of an example of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An interpreter, a virtual machine, or other run-time platform, such as a JAVA™ Virtual Machine, may run in conjunction with the operating system and provides calls to the operating system from programs in the JAVA™ programming language or other applications executing on data processing system 200. Instructions for the operating system, the run-time platform, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a method, computer program product, and data processing system for modifying attributes of GUI components without invasive code modification. According to a preferred embodiment of the present invention, a set of GUI component attributes are loaded from persistent storage in a markup language, and the set of GUI component attributes are recursively applied to a set of instantiated GUI components in a run-time environment.

These terms are defined as follows: A "set" is an aggregation of zero or more items. A "GUI component" is a constituent element of a graphical user interface (GUI). An "attribute" of a GUI component is information that defines a property of the component; some examples of attributes include, but are not limited to, display attributes defining the appearance of a GUI component, behavior attributes defining the behavior of a GUI component, and informational attributes that define miscellaneous information to be associated with the component. "Persistent storage" is a storage system or medium for storing data in which the data is stored in a way that preserves the data during periods of time in which an item of computer software that uses the data is not executing. A "markup language" is a human-readable language for expressing data in which textual data is given a computer-discernable semantics by the annotation of the textual data with computer readable tags.

To "instantiate" a GUI component means to create a representation (an "instance") of a particular GUI component in a data processing system, usually in the memory of the data processing system. The concept of instantiating a component can be roughly described as "making" the component. Thus, a computer program that has code that defines the operation, behavior, and appearance of a "button" GUI component will not have "instantiated" a "button" until a representation of a particular "button" is created. In the context of GUI components that are defined as classes (e.g., in an object-oriented programming language), this representation will generally be an object that is an instance of the class. For the purposes of the this specification and the accompanying claims, however, representations of a particular GUI component in a data processing system that are not objects, in the object-oriented sense, are also said to be "instantiated."

A "run-time environment," for the purposes of this specification and the accompanying claims, is a process, thread, memory space, virtual machine, data storage, or other entity in a data processing system, in which the process, thread, memory space, virtual machine, data storage or other entity is associated with computer software under execution. A data processing system performs an action "recursively" when the action is performed by a function, method, procedure, or other form of routine that re-invokes itself in a self-referential manner (e.g., a function that contains a function call to itself).

Turning now to FIG. 3, a diagram of a file in eXtensible Markup Language (XML) representing a set of attributes for GUI components in accordance with a preferred embodiment of the present invention is provided. XML is a standard for a markup language that was developed by the World Wide Web Consortium (W3C). XML is called eXtensible Markup Language, because it allows for the creation of user-defined tags. For example, the tags employed in the file depicted in FIG. 3 are defined to represent GUI components and their attributes. The file depicted in FIG. 3 is, in a preferred embodiment, stored in some kind of persistent storage, such as on disk, or in a database. One of ordinary skill in the art will recognize that any of a number of different storage formats and media may be employed to store GUI component attribute information in accordance with the teachings of the present invention.

In a preferred embodiment, a set of attributes, such as are stored in the file depicted in FIG. 3, will be loaded into the memory space of a run-time environment. Then, an attribute application routine, such as that depicted in pseudo-code form in FIGS. 6A-6B, is executed to apply the set of attributes to instantiated GUI components in the run-time environment. This allows global or at least wide-spread changes to GUI attributes to be made in a single line of code (i.e., a call to the attribute application routine), thus preventing major code revisions. It also allows display attribute information to be decoupled from the program code itself (i.e., by use of a file or database, such as depicted in FIG. 3), so that once the small amount of code needed to call the attribute application routine is inserted in a program, attributes may be redefined without resorting to code changes at all.

Turning now to the specifics of FIG. 3, GUI component attribute information in this preferred format is surrounded by begin and end tags 300. Begin and end tags 300 identify that the information contained within begin and end tags 300 refer to GUI component attributes (also called properties). In many markup languages, such as the XML markup language that is depicted in FIG. 3, data is arranged in a hierarchical format. In the XML example in FIG. 3, begin and end tags 300 represent a highest level in the hierarchy of information provided in the file depicted in FIG. 3. Each level in the hierarchy is represented by tags that surround information at lower levels in the hierarchy. For example, tags 302 and tags 318 denote two sets of information residing at the next lowest level in the hierarchy from begin and end tags 300.

Tags 302 represents the default attributes for a "button" GUI component. At the next lowest level from tags 302 are tags 304 and tags 306. Tags 304 and tags 306 denote different display modes, namely a day mode and a night mode. The run-time environment making use of the set of attributes provided in FIG. 3 may specify that the run-time environment is operating in a particular display mode. For example, during the day, the run-time environment may operate in a "day mode," while the run-time environment may operate in a "night mode" for easier viewing at night. Tags 304 represent that the information contained within tags 304 corresponds to attributes of a button to be applied when the run-time environment is operating in day mode. Likewise, tags 306 denote that the information contained within tags 306 corresponds to attributes to be applied to a button GUI component when the run-time environment is operating in night mode.

The information contained within tags 304 corresponds to the individual attribute to be applied to a button GUI component in day mode. Line 308, for example, specifies a background color for a button GUI component to be applied in day mode. Tags 309 designate that the attribute of background color is specified. Text 311, which is surrounded by tags 309, is the actual specified background color. Note that text 311 is not a tag, but is merely textual data. In a markup language such as XML, tags are generally used to provide structure to the data, but the data itself may be specified as raw text, as is the case with text 311. Line 310 similarly specifies a foreground color attribute by surrounding textual data with tags. Tags 312 are included in this example to show that individual attributes may include their own sub hierarchy of sub-attributes. Tags 312 denote that the information contained within tags 312 specifies the font to be applied to a button GUI component in day mode. A specific font, however, is generally specified using more than one item of information. Line 314, which is contained within tags 312, specifies a font name, while line 316 specifies a type of font, such as bold face or italics. Each of these sub-attributes is specified by surrounding textual data with tags that impart a meaning and structure to the data. For example, line 314 includes tags 315 that specify that the information contained within tags 315 is the name of font to be used. Text 317, which is contained within tags 315, is the actual designation of a particular font name.

The information contained within tags 302, just examined, specifies default attributes to be applied to button GUI components in either of a day mode and a night mode. Tags 318 also specify a set of GUI attributes to be applied to a button GUI component, but tags 318 correspond to attributes to be applied to a specifically named button GUI component. A tag attribute 320 is included within the first of tags 318 to specify that tags 318 correspond to GUI component attributes to be applied to a specifically named button GUI component. In the example presented in FIG. 3, tag attribute 320 is used to designate that the name of the specific button GUI component to which the attributes contained within tags 318 correspond is "OK." Allowing specific GUI components to be named within the set of attributes allows exceptions to be made to the default GUI component attribute settings for particular components. For example, it may be useful to establish global or default settings for button GUI components or other GUI components, while at the same time specifying that certain GUI components have different attributes, such as in the case of an "OK" or "Accept" button, where it may be desirable to make the button more conspicuous on the user's display.

A preferred embodiment of the present invention applies a set of attributes, such as are depicted in FIG. 3, to some or all of the instantiated GUI components associated with a run-time environment. FIGS. 4-6B concern how a set of GUI attributes, once loaded into memory, may be applied to a set of GUI components containing all or some of the instantiated components in a run-time environment. A preferred embodiment of the present invention accomplishes this application of GUI component attributes over a set of GUI components by exploiting the containment relation between container components and GUI components contained within container components. In an object-oriented programming language or other programming environments supporting object or object models, the relation between GUI components and their containers is easily expressed in terms of classes.

Figure 4:
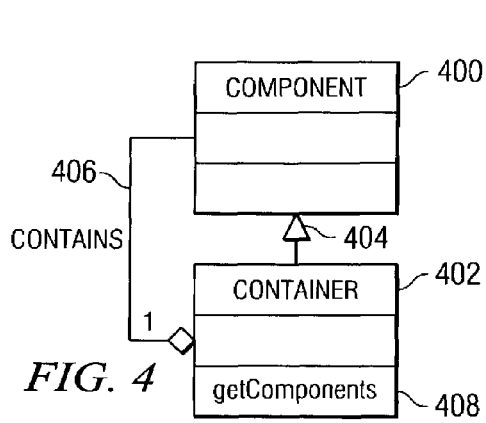
FIG. 4 is a class diagram of component and container classes in the object model of a GUI that may be used in conjunction with a preferred embodiment of the present invention.

FIG. 4 is a class diagram depicting a relationship between GUI components and containers in a preferred embodiment of the present invention. FIG. 4 is expressed in a notation that is based roughly on Uniform Modeling Language (UML), an standard for writing software specifications that is maintained by the industry organization OMG (Object Management Group). FIG. 4 assumes that GUI components are instances of object-oriented classes. In FIG. 4, a component class 400 is defined as a base class for all GUI components. As a container component is a type of GUI component, a container class 402 is descended from (inheritance relation 404) component class 400. Container class 402 may be related to one or more instances of component class 400 via containment relation 406. In an actual embodiment, containment relation 406 may be represented as a data structure accessible to instances of container class 402 via a member variable, such that this data structure may contain pointers or other references to instances of component class 400. A method 408 of container class 402 is defined so as to return the list or set of instances of component class 400 that are contained by an instance of container class 402. In the AWT API provided with the JAVA™ programming language, component class 400 corresponds to the "java.awt.Component" class and container class 402 corresponds to the "java.awt.Container" class. In the java.awt.Container class, method 408 is called "getComponents."

One of ordinary skill in the art will recognize that because of polymorphism, an instance of container class 402 may contain any instance of a GUI component class that is descended from component class 400. This means that an instance of container class 402 may also contain another instance of container class 402, as container class 402 is descended from component class 400. Thus, a graphical user interface patterned after the object model provided in FIG. 4 will utilize GUI components arranged in a hierarchical structure according to a containment relation that relates container components to components contained within the container components. Such a hierarchy is depicted in FIG. 5.

Figure 5:
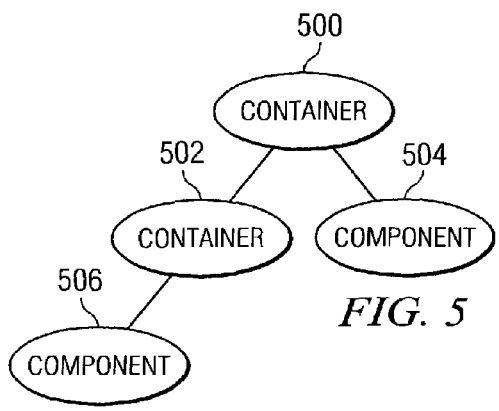
FIG. 5 is a diagram of a hierarchical set of GUI components defined by a containment relation.

FIG. 5 shows a container component 500 that contains both another container component 502 and a non-container component 504. Container component 502 also contains another non-container component 506. As can be seen from FIG. 5, this hierarchical arrangement of containers and non-container components has a tree-like structure. Container 500 can best be considered a "root container" because container component 500 defines a hierarchically structured set of GUI components that are, at least in a transitive sense, contained by container component 500. A preferred embodiment of the present invention applies GUI component attributes to each of the GUI components within the hierarchical set defined by container component 500 by traversing the tree-like hierarchy and applying appropriate GUI attributes to each component. One of ordinary skill in the art will recognize that a tree-like hierarchy can be traversed in a number of different ways. For example, depth-first search and breadth-first search are two well-known techniques for exhaustively traversing a tree-like hierarchy. Depth-first search and breadth-like search are described generally in Cormen, Lieserson, Rivest and Stein, *Introduction to Algorithms Second Edition,* MIT Press, 2001, pp. 526-560.

FIGS. 6A and 6B are diagrams of an attribute application routine (in this case, a method) for applying attributes to GUI components in a JAVA™-like pseudo-code in accordance with a preferred embodiment of the present invention. FIGS. 6A and 6B are intended to be read together as a single listing of pseudo-code, with FIG. 6B providing a continuation of the listing, which starts in FIG. 6A. In this discussion, it is assumed that a set of attributes to be applied has been loaded into memory (e.g., from a file or other persistent storage such as the XML file in FIG. 3) and the GUI components to which the attributes will be applied have already been instantiated.

Turning now to FIG. 6A, line 602 defines a method 600 for applying GUI attributes to GUI components. Line 602 specifies that a root container, called "container" (here italicized to distinguish the identifier name from the generic term "container), is passed in as an argument to method 600. Throughout this discussion, we will refer to the object passed into method 600 as "container," since that is the name of the parameter that refers to that object. It should be noted, however, that, strictly speaking, "container" is a parameter that only refers to an actual object and that actual object has its own object name that existed from when the object was instantiated. That object name will generally be distinct from the name "container." In this discussion, it will be specifically noted when container is used to refer to the parameter only, rather than to the object referred to by the container parameter.

It should also be noted that, although it is not depicted in FIG. 6A, method 600 may be written so as to allow a "mode" parameter to be passed in to allow only those attributes pertaining to a particular display mode, specified by the "mode" parameter, to be applied to instantiated GUI components. Another way in which a display mode can be specified is to set a "mode" variable that can be accessed by the routines and sub-routines that will apply attributes to instantiated GUI components, such as method 600 and the method called on line 610, for example.

Execution of method 600 begins with statement 604, which specifies that if container is a null pointer "i.e., container does not refer to an actual container", method 600 should be exited immediately to avoid triggering an error condition or exception.

Next, properties are set for container. "if" statement 606 sets out instructions to be followed in the case that container refers to a JPanel. "if" statement 608 specifies that statement 610 should be executed if container refers to a container that is specifically named in the set of GUI component attributes to be applied (e.g., as in FIG. 3). "if" statement 608 makes use of an object called "named" to determine whether the object name of container (i.e., the name given at the time of instantiation to the object referred to by the parameter container) is among the names of specifically named GUI components from the set of attributes to be applied. A method called "getName" that is associated with the class Container (as in the "java.awt.Container" class in the JAVA™ programming language) is used to retrieve container's name. Statement 610, which is called if container refers to a container that is specifically named in the set of attributes to be applied (e.g., such as the button named "OK" in FIG. 3), calls a method that takes container and container's object name as arguments and assigns attributes from the set of attributes to container based on the specified attributes in the set of attributes that correspond to the container's object name. In this object-oriented preferred embodiment, the actual setting of GUI component attributes is accomplished by calling methods that belong to the objects that represent the GUI components. For example, the method called in statement 610 will execute methods of container in order to set the attributes of container to values specified in the loaded set of attributes.

"else" statement 612 executes statement 614 to apply the default attributes to container in the event that container is not a specifically named container in the set of attributes to be applied. In like fashion, additional "if" statements, such as "if" statement 606, maybe used to apply appropriate attributes to the container according to the type of container (e.g., panel, window, dialog box, etc.).

Assignment statement 616 uses the "getComponents" method of container to obtain an array of components that are contained by container. "if" statement 618 then specifies that if container contains no components, method 600 should terminate immediately, as no further processing on container is necessary. Otherwise, loop statement 620 sets up a loop that iterates over the array of components contained within container. A series of if statements are used to determine the type of component that is current component in the loop and whether the current component is a specifically named component in the set of attributes, such that specific attributes for that component should be applied from the set of attributes.

For example, "if" statement 622 specifies a set of instructions to be executed if the current component is an instance of a JButton, a JAVA™ Swing GUI component. If the current GUI component is an instance of a JButton, "if" statement 624 determines whether the current component is a specifically named JButton in the set of attributes. If the current component is a specifically named JButton in the set of attributes, statement 626 provides a call to a method to apply attributes to the current component that correspond to the object name of the current component. Otherwise, "else" statement 628 specifies that statement 630 is to be executed to apply default JButton attributes to the current component. After either statement 626 or statement 630 is executed, "continue" statement 632 is executed to advance the loop to the next component contained by the container. "if" statement 634, which continues into FIG. 3B, sets out a similar set of instructions to be followed in the case that the current component is an instance of a JLabel component, another JAVA™ Swing GUI component. Likewise, for each additional non-container component type, a similar set of instructions is provided to allow appropriate attributes to be applied with respect to the type of the current component considered in the loop and, if applicable, the object name of the current component. This is represented by comment line 646.

"if" statement 648 is the last statement to be executed at each iteration of the loop defined by loop statement 620. "if" statement 648 specifies that if the current component is an instance of the container class (i.e., the current component is itself a container), method 600 is to be called recursively with the current component passed as an argument to method 600. The recursive call performed as part of "if" statement 648 causes method 600 to implement a depth-first search.

It should be noted at this point that although method 600 performs a depth-first traversal recursively, method 600 need not be implemented as a recursive method. For example, method 600 could be implemented iteratively, by employing an appropriate data structure, such as a stack or queue, to keep a running record of components that have been discovered, but have yet to be examined. One of ordinary skill in the art will recognize that, in general, a recursive method or function such as method 600, can usually be implemented in an iterative (i.e., non-recursive) form, as this is a general principle of computer science.

FIG. 7 is a flowchart representation of a process followed by run-time environment to apply attributes to instantiated GUI components in a preferred embodiment of the present invention. The set of attributes to be applied is loaded, preferably from persistence storage (block 700). GUI components for the run-time environment are instantiated (block 702). It should be noted that blocks 700 and 702 may also be executed in the reverse order. Properties are applied to the instantiated GUI components by calling an attribute application routine with the root container of the instantiated GUI components passed to the routine of a parameter (block 704).

Figure 8:
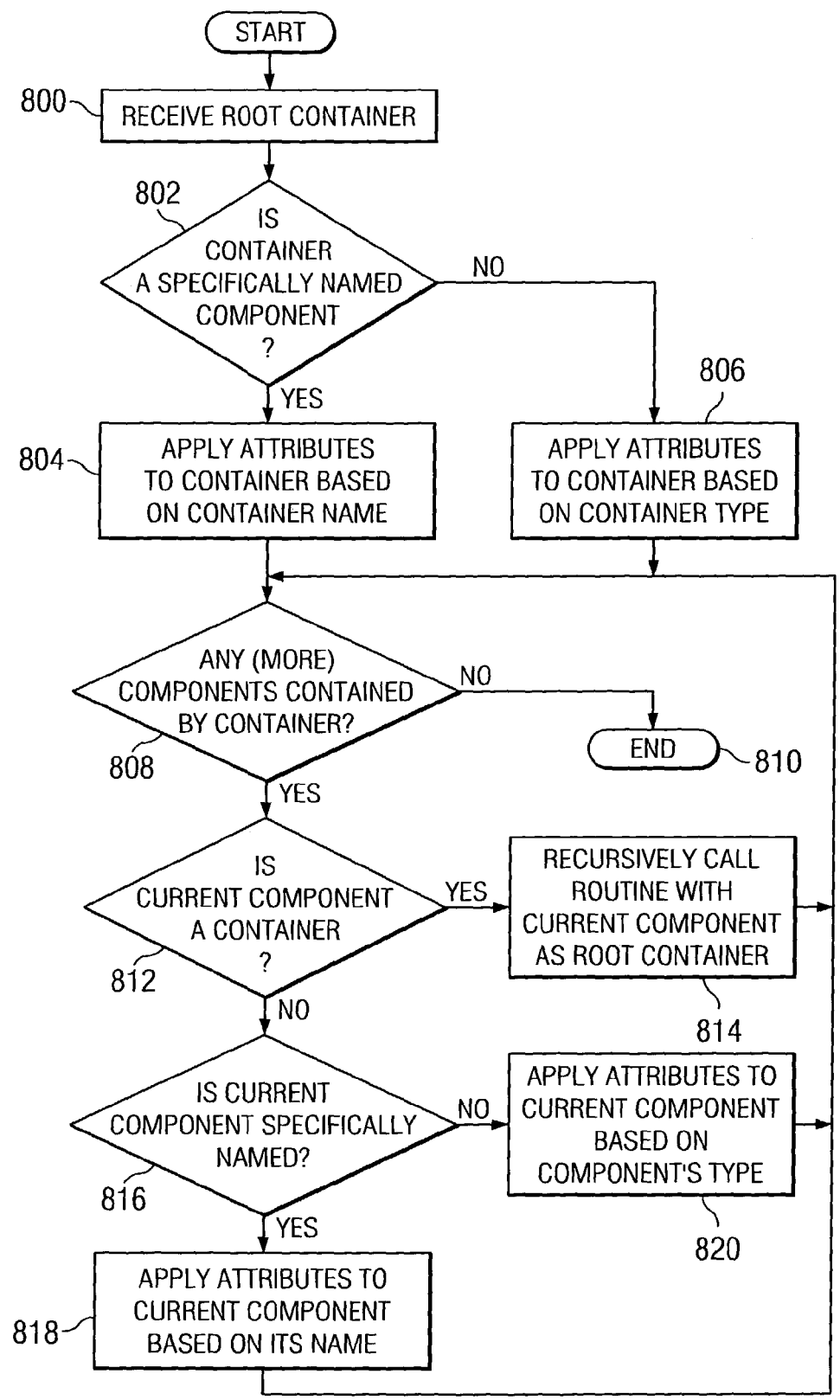
FIG. 8 is a flowchart representation of a process followed by an attribute application routine to apply attributes to GUI components in a hierarchical set of GUI components in accordance with the preferred embodiment of the present invention.

FIG. 8 is a flowchart representation of a process followed by an attribute application routine to apply attributes to GUI components in a hierarchical set of GUI components in accordance with the preferred embodiment of the present invention. A root container for the hierarchical set of GUI components is received, preferably as a parameter to the attribute application routine (block 800). A determination is then made as to whether the root container is a specifically named component in the set of attributes to be applied (block 802). If the container is a specifically named component (block 802: yes), then attributes are applied to the container based on the containers name (block 804). Otherwise (block 802: no), default attributes are applied to the container based on the containers type (block 806). If any components are contained by the container (block 808: yes), execution progresses to block 812. Otherwise (block 808: no), execution of the attribute application routine terminates (block 810). It should be noted that block 808 establishes a loop that iterates over the set of components contained within the container. Thus, the remaining blocks (blocks 812-820, even numbers) refer to a current component, meaning the component currently being considered by the loop defined by block 808 over the set of components contained within the container.

Referring now to an iteration of the loop as it begins in block 812, if the current component is itself a container (block 812: yes), a recursive call is made to the attribute application routine with the current component being the root container (block 814). After the recursive call in block 814 is completed, the process cycles back to block 808 to continue the loop. If the current component is not a container (block 812: no), execution continues to block 816.

If the current component is a specifically named component in the set of attributes (block 816: yes), attributes are applied to the current component based on the components name (block 818). Otherwise, (block 816: no), default attributes are applied to the current component based on the components type (block 820). Following execution of either block 818 or block 820, the process cycles to block 808 to continue the loop.

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-based method for modifying a user interface associated with a run-time environment, the method comprising:

retrieving data defining a set of attributes for graphical user interface components from persistent storage, wherein the set of attributes are specified in a markup language;

dynamically applying the set of attributes to instantiated graphical user interface components associated with the run-time environment so as to modify at least a subset of the instantiated graphical user interface components, wherein a first subset of the set of attributes are applied to the instantiated graphical user interface based on a type of the instantiated graphical user interface, wherein a second subset of the set of attributes are further applied to the instantiated graphical user interface based on a name of a container that is named in the set of attributes, wherein the first subset of attributes and the second subset of attributes are each smaller than the set of attributes, and wherein the instantiated graphical user interface components associated with the run-time environment are objects in an object-oriented programming language; and automatically setting a variable to indicate a current mode for the run-time environment, wherein different subsets of attributes in the set of attributes correspond to different modes and one of the subsets of attributes is applied to the instantiated graphical user interface components according to the current mode.

2. The method of claim 1, wherein the persistent storage is a file.

3. The method of claim 1, wherein the persistent storage is a database.

4. The method of claim 1, further comprising:

identifying a root container of the instantiated graphical user interface components associated with the software product, wherein the root container defines a hierarchy containing the instantiated graphical user interface components associated with the run-time environment; and traversing the hierarchy to apply the set of attributes to each graphical user interface component as each graphical user interface component is visited.

5. The method of claim 1, wherein the different modes are display modes.

6. The method of claim 5, wherein the current mode for the run-time environment is one of the display modes, and wherein the display modes include a day mode and a night mode.

7. A computer-based method for modifying a user interface presented by a software product, the method comprising:

establishing a data structure defining a set of attributes for graphical user interface components, wherein the set of attributes are specified in a markup language;

identifying a root container of a hierarchy of graphical user interface components, wherein the hierarchy of graphical user interface components is defined by a containment relation, and wherein each of the graphical user interface components in the hierarchy are objects in an object-oriented run-time environment;

traversing the hierarchy of graphical user interface components so as to visit each graphical user interface component in the hierarchy;

for each visited graphical user interface component as each visited graphical user interface component is visited in the hierarchy, if at least one attribute that may be applied to the visited graphical user interface component exists within the set of attributes, applying the at least one attribute to the visited graphical user interface component so as to put the visited graphical user interface component into compliance with the set of attributes, wherein a first subset of the set of attributes are applied to the visited graphical user interface based on a type of the instantiated graphical user interface, wherein a second subset of the set of attributes are further applied to the visited graphical user interface based on a name of a container that is named in the set of attributes, wherein the first subset of attributes and the second subset of attributes are each smaller than the set of attributes, and wherein the visited graphical user in interface component is an instantiated graphical user interface; and automatically setting a variable to indicate a current mode for the run-time environment, wherein different subsets of attributes in the set of attributes correspond to different modes and attributes from one of the subsets of attributes are applied to the instantiated graphical user interface components according to the current mode.

8. The method of claim 7, wherein the data structure is established by reading data from a file.

9. The method of claim 7, wherein the different modes are display modes.

10. The method of claim 7, wherein the objects include container objects and other component objects and the container objects and other component objects are descended from a common base class.

11. The method of claim 7, wherein the hierarchy of graphical user interface components is traversed recursively.

12. The method of claim 9, wherein the current mode for the run-time environment is one of the display modes, and wherein the display modes include a day mode and a night mode.

13. A method implemented in a computer for modifying a user interface presented by a software product, the method comprising:

inserting into a program code file a call to a routine, wherein the routine traverses a hierarchy of graphical user interface components and applies attributes from a set of attributes to each of the graphical user interface components for which applicable attributes exist in the set of attributes, wherein the set of attributes are specified in a markup language, wherein each of the graphical user interface components for which applicable attributes exist comprise, together, a group of instantiated graphical user interface components, wherein a first subset of the set of attributes are applied to the group of instantiated graphical user interface based on a type of the instantiated graphical user interface, wherein a second subset of the set of attributes are further applied to the group of instantiated graphical user interface based on a name of a container that is named in the set of attributes, and wherein the first subset of attributes and the second subset of attributes are each smaller than the set of attributes.

14. The method of claim 13, wherein the call includes a root container parameter, wherein the root container parameter identifies a root container associated with the hierarchy of graphical user interface components.

15. The method of claim 13, wherein the call includes a mode parameter, wherein the mode parameter identifies at least one subset of the set of attributes and the routine applies only the at least one subset of the set of attributes to the graphical user interface components in the hierarchy.

16. The method of claim 13, wherein the program code file is a source code file.

17. The method of claim 13, wherein the program code file is one of an object code file, a library file, a bytecode file, and an executable file.

18. A computer-based method for modifying a user interface associated with a run-time environment, the method comprising:

retrieving data defining a set of attributes for graphical user interface components from persistent storage, wherein the set of attributes are specified in a markup language, and wherein the persistent storage is one of a file and a database;

dynamically applying the set of attributes to instantiated graphical user interface components associated with the run-time environment so as to modify at least a subset of the instantiated graphical user interface components, wherein a first subset of the set of attributes are applied to the instantiated graphical user interface based on a type of the instantiated graphical user interface, wherein a second subset of the set of attributes are further applied to the instantiated graphical user interface based on a name of a container that is named in the set of attributes, wherein the first subset of attributes and the second subset of attributes are each smaller than the set of attributes, and wherein the instantiated graphical user interface components associated with the run-time environment are objects in an object-oriented programming language;

automatically setting a variable to indicate a current mode for the run-time environment, wherein different subsets of attributes in the set of attributes correspond to different modes and one of the subsets of attributes is applied to the instantiated graphical user interface components according to the current mode, wherein the different modes are display modes, wherein the current mode for the run-time environment is one of the display modes, and wherein the display modes include a day mode and a night mode;

identifying a root container of the instantiated graphical user interface components associated with the software product, wherein the root container defines a hierarchy containing the instantiated graphical user interface components associated with the run-time environment; and traversing the hierarchy to apply the set of attributes to each graphical user interface component as each graphical user interface component is visited.

* * * * *